United States Patent
Iwamoto et al.

(10) Patent No.: US 6,630,272 B1
(45) Date of Patent: Oct. 7, 2003

(54) NON-AQUEOUS ELECTROCHEMICAL DEVICE

(75) Inventors: Kazuya Iwamoto, Sakai (JP); Takafumi Oura, Hirakata (JP); Shinji Nakanishi, Hirakata (JP); Atsushi Ueda, Osaka (JP); Hizuru Koshina, Neyagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 200 days.

(21) Appl. No.: 09/856,242

(22) PCT Filed: Oct. 12, 2000

(86) PCT No.: PCT/JP00/07069

§ 371 (c)(1),
(2), (4) Date: May 18, 2001

(87) PCT Pub. No.: WO01/28027

PCT Pub. Date: Apr. 19, 2001

(30) Foreign Application Priority Data

Oct. 13, 1999 (JP) ............................... 11-290673

(51) Int. Cl.$^7$ ............................................. H01M 10/40
(52) U.S. Cl. .................... 429/328; 429/336; 429/339; 429/340
(58) Field of Search ................. 429/328, 336, 429/339, 340

(56) References Cited

U.S. PATENT DOCUMENTS 6,090,504 A   7/2000   Sung et al. ................ 429/213

FOREIGN PATENT DOCUMENTS

| JP | 56-82579 | 7/1981 | |
| JP | 6-322595 | 11/1994 | |
| JP | 9-213348 | 8/1997 | |
| JP | 10-50344 | 2/1998 | |
| JP | 11-111335 | 4/1999 | |
| JP | 11-144730 | 5/1999 | |
| JP | 11-291259 | 10/1999 | |
| JP | 2000-123823 | * 4/2000 | .......... H01M/10/40 |
| JP | 2000 299131 | 10/2000 | |

OTHER PUBLICATIONS

English translation of Japanese Kokai 6–322,595 Document published Nov. 22, 1994.*

PCT International Search Report dated Dec. 26, 2000.

K. Mori, et al., "Accelerating Effect of NaNO$_2$ on Organic Polymer Plating of 6–diallylamino–1, 3, 5–triazine–2, 4–dithiols", *The Journal of the Surface Finishing Society of Japan*, Vo. 50, No. 5, pp. 460–466 (May 1999).

* cited by examiner

*Primary Examiner*—Stephen Kalafut

(57) ABSTRACT

The present invention relates to an electrolyte for non-aqueous electrochemical device containing at least one of 6-substituted-1,3,5-triazine-2,4-dithiol and derivatives thereof as an additive and a non-aqueous electrochemical device, particularly a lithium secondary battery by the use thereof. The additive of the present invention forms a stable and low resistance film on the positive electrode, inhibiting characteristics of the electrochemical device from deteriorating on account of gas generated due to the decomposition of electrolyte.

6 Claims, 1 Drawing Sheet

NON-AQUEOUS ELECTROCHEMICAL DEVICE

TECHNICAL FIELD

The present invention relates to an electrolyte for non-aqueous electrolyte electrochemical device and a non-aqueous electrolyte electrochemical device by the use thereof. More particularly, it relates to a non-aqueous electrolyte lithium secondary battery.

BACKGROUND ART

Non-aqueous electrolyte electrochemical devices containing a negative active material comprising a light metal such as lithium, sodium and the like have found the application in the wide areas of various electrical and electronic appliances. The non-aqueous electrolyte electrochemical devices include batteries, capacitors for electronic double layer and the like. Particularly, the non-aqueous electrolyte secondary batteries are charge-discharge batteries having a high energy density and capable of miniaturization and lightening and have now been researched and developed on an extensive scale.

A non-aqueous electrolyte secondary battery is constituted with a positive electrode, a negative electrode and a separator (diaphragm) keeping the positive electrode apart from the negative electrode.

The solvents used in the electrolytes for non-aqueous electrolyte battery are mostly cyclic carbonates represented by propylene carbonate (PC) and ethylene carbonate (EC); chain carbonates represented by diethyl carbonate (DEC) and dimethyl carbonate (DMC); cyclic carboxylates represented by γ-butyrolactone (GBL) and γ-valerolactone (GVL); chain ethers such as dimethoxymethane (DMM), 1,3-dimethoxypropane (DMP) and the like; and cyclic ethers such as tetrahydrofuran (THF) or 1,3-dioxolane (DOL) and the like.

When these solvents are applied to the non-aqueous electrolyte secondary batteries, those having a high electrical conductivity or a high relative permittivity but a low viscosity are preferred. However, the high relative permittivity means nothing but a strong polarity that is accompanied by a high viscosity. In many cases of the practical batteries now available, therefore, the solvents having a high permittivity such as ethylene carbonate (permittivity $\epsilon$=90) and the solvents having a low permittivity such as dimethyl carbonate (DME, $\epsilon$=3.1) or ethylmethyl carbonate (EMC, $\epsilon$=2.9) are used in combination, chosen from among the electrolytes above.

The electrolytes used in non-aqueous electrolyte batteries are prepared by dissolving supporting electrolytes in said solvents in a concentration of approximately 1 mol. The supporting electrolytes which can be used herein are anion lithium salts of inorganic acid represented by lithium perchlorate ($LiClO_4$), lithium borofluoride ($LiBF_4$) and lithium phosphofluoride ($LiPF_6$); and anion lithium salts of organic acid such as lithium trifluoromethanesulfonate ($LiSO_3CF_3$), imidolithium bistrifluoromethanesulfonyl imide lithium (($CF_3SO_2)_2NLi$) and the like.

The separators which can be used herein are insoluble in said non-aqueous electrolytes, for example, comprising a polyethylene or polypropylene resin porous diaphragm.

The positive active materials which can be used herein are lithium of cobaltate ($LiCoO_2$), lithium nickelate ($LiNiO_2$), lithium manganate ($LiMn_2O_4$, $LiMnO_2$) and lithium ferrate ($LiFeO_2$); parts of these transition metals (Co, Ni, Mn, Fe) substituted with other transition metals such as tin (Sn), aluminum (Al) and the like; transition metal oxides such as vanadium oxide ($V_2O_5$), manganese dioxide ($MnO_2$), molybdenum oxide ($MoO_2$, $MoO_3$) and the like; and transition metal sulfides such as titanium sulfide ($TiS_2$), molybdenum sulfide ($MoS_2$, $MoS_3$), iron sulfide ($FeS_2$) and the like.

The negative active materials which can be used herein are lithium ions or sodium ions, and the negative host materials useful for them are amorphous carbon materials; carbon materials such as artificial or natural graphite calcined at 2000° C. or higher; metals such as aluminum (Al), lead (Pb), tin (Sn), bismuth (Bi), silicon (Si) and the like, capable of alloying with alkaline metals; interstitial alkaline metal inserted type crystal system based intermetallc compounds (AlSb, $Mg_2Si$, $NiSi_2$); and lithium nitrogen compounds ($Li_{(3-x)}M_xN$ (M: transition metal)) and the like.

In recent years, the non-aqueous electrolyte secondary batteries using the above host materials capable of storing and releasing the alkaline metal ions in the negative electrodes have been predominant, replacing the other non-aqueous electrolyte secondary batteries with alkaline metals performing the double role of active material source and electronic collector.

Since the non-aqueous electrolyte secondary batteries have characteristics of high voltage and high energy density, the negative host materials used for them are preferably the substances generating a voltage close to that of alkaline metals, i.e. above amorphous carbon materials or carbon materials such as artificial or natural graphite calcined at 2000° C. or higher. In these substances, however, the alkaline metal ions contained therein are liable to react with the electrolytes at high temperatures, giving rise to the evolution of heat or gas.

On the other hand, the non-aqueous electrolyte secondary batteries are high in voltage and also high in the energy density, and it is likely that the oxidative decomposition of the solvents or solutes would occur even on the positive electrodes. The higher the temperatures are the more conspicuous these phenomena are, and when the batteries are stored at such high a temperature as 60° C. or 85° C., the reductive decomposition occurs at the side of negative electrodes and the oxidative decomposition at the side of positive electrodes with the result that a great deal of gas evolves. Furthermore, in recent years the non-aqueous electrolyte secondary batteries are widely used as the backup power source in note type personal computers, the temperatures are always from 45° C. to 60° C. in the inside of the note type personal computers, constant voltage of 4.2V is applied to enable the computers to maintain the high capacity at such high temperatures all the times, and thus gas is easy to evolve therein.

If gas evolves at the time of high temperatures, pressure rises within the batteries to drive the safety devices, cutting off the electric current or causing the deterioration of battery characteristics, and there has been a strong demand for improvement.

In the high temperature environment as described above, catalyst power to oxidize is made stronger particularly on the positive electrodes and the oxidative decomposition of the non-aqueous solvents occurs on the surface of positive electrodes, decreasing the conductivity of electrolyte to deteriorate discharge characteristics or developing the decomposition product in the form of gas (for example, carbon dioxide gas) and, if the worst happens, the electrolytes have been found to leak.

In an attempt to find a solution in said problems, many methods have been proposed for incorporating the additives capable of forming films on the positive and negative electrodes into the electrolytes. Although these additives are effective in inhibiting gas from evolving, however, they have a problem that many of them are inclined to form highly resistant films on the electrodes, deteriorating the batteries in their characteristics of charge and discharge, particularly characteristics of high rate discharge or those of low temperature discharge.

In Hyomen Gijutsu (The Journal of the Surface Finishing Society of Japan), 50 (5), 460 (1999), Kunio Mori et. al. have disclosed a technique for forming an organic deposit film from a 6-substituted-1,3,5-triazine-2,4-dithiol. It has been described that the organic deposit films can find an application in imparting mold release characteristics to metal molds or in directly bonding metals with polymers or in techniques for preventing metals from corroding away.

DISCLOSURE OF INVENTION

In a process of investigating the additives in the electrolytes, the present inventors have found that an organic film can be formed on the positive electrode in full control of film forming voltage and rate under the ordinary manufacturing and/or use conditions of batteries by incorporating at least one of 6-substituted-1,3,5-triazine-2,4-dithiol and its derivatives into a non-aqueous electrolyte of a non-aqueous electrolyte electrochemical device comprising at least two electrodes, wherein the non-aqueous electrolyte comprises a solute dissolved in a non-aqueous solvent and a separator arranged between the two electrodes. These organic films have been found to be stable and capable of preventing the non-aqueous electrolytes from coming into the direct contact with the electrodes and consequently taking an effect of inhibiting the deterioration of characteristics attributed to gas that would be evolved at the time of charging or high temperature storage. Furthermore, it has also been found that the so obtained films are low in resistance, making it possible to provide a novel non-aqueous electrolyte electrochemical device useful in a wide range of temperatures, having a high energy density, low in the decrease of the discharge capacity even after the repeated use and excellent in high rate charge-discharge characteristics, and the present invention has been completed on the basis of these findings.

The present invention relates to an electrolyte for non-aqueous electrochemical device, which comprises at least one of 6-substituted-1,3,5-triazine-2,4-dithiol and derivatives thereof represented by the formula (I):

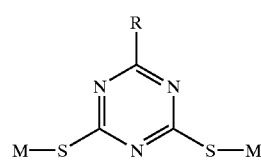

(I)

wherein R is a nitrogen-containing functional group; and M is a hydrogen or an alkali metal.

The present invention provides an excellent novel non-aqueous electrochemical device useful in a wide range of temperatures by using the electrolyte in a non-aqueous electrochemical device comprising at least two electrodes, a non-aqueous electrolyte containing a solute dissolved in a non-aqueous solvent and a separator arranged between the two electrodes.

Furthermore, the present invention provides an novel lithium secondary battery having a high energy density, low in the decrease of the discharge capacity attributable to the repeated use of the battery and excellent in high rate charge-discharge characteristics by using the non-aqueous electrolyte in a lithium secondary battery comprising a positive electrode, a negative electrode containing a lithium as the active material, an electrolyte containing a solute having a lithium as a cation that is dissolved in a non-aqueous solvent and a separator arranged between the two electrodes.

The compound 6-substituted-1,3,5-triazine-2,4-dithiol and derivatives thereof used in the present invention are represented by the following formula (I):

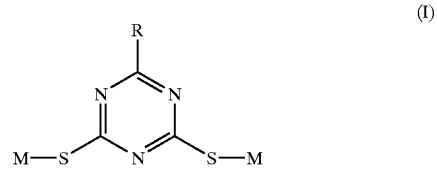

(I)

wherein R is a nitrogen-containing functional group; and M is a hydrogen or an alkali metal. The nitrogen-containing functional group is preferably represented by the formula —$NR_1R_2$. In the formula, $R_1$ and $R_2$ are each independently alkyl, aryl or hydrogen, preferably alkyl.

The term alkyl used herein means straight-chain $C_{1-30}$ alkyl or branched chain $C_{1-30}$ alkyl and branched or unbranched $C_{3-30}$ cycloalkyl unless otherwise described. These groups may as well be either saturated or unsaturated, unless otherwise described.

Particularly, saturated or unsaturated $C_{1-10}$ alkyl, for example, methyl, ethyl, propyl, butyl, pentyl, hexyl, heptyl, octyl, nonyl, decyl, or vinyl, allyl, isopropenyl and the like are preferable.

The term aryl used herein means a group containing the aromatic rings singly or in combination of two or more, and the specific examples of ring include, but not limiting to these examples, benzene, biphenyl, terphenyl and the like. These rings may as well be optionally substituted with alkyl above, particularly preferably $C_{6-30}$ aryl.

The alkaline metal represented by M is preferably sodium, potassium, lithium, calcium or magnesium, more preferably sodium or lithium and most preferably lithium.

The preferable specific examples of the compound represented by the formula (I) are 6-dimethylamino-1,3,5-triazine-2,4-dithiol, 6-diethylamino-1,3,5-triazine-2,4-dithiol, 6-dipropyloctylamino-1,3,5-triazine-2,4-dithiol, 6-dibutylamino-1,3,5-triazine-2,4-dithiol, 6-dipentyloctylamino-1,3,5-triazine-2,4-dithiol, 6-dihexylamino-1,3,5-triazine-2,4-dithiol, 6-diheptylamino-1,3,5-triazine-2,4-dithiol, 6-dioctylamino-1,3,5-triazine-2,4-dithiol, 6-dinonylamino-1,3,5-triazine-2,4-dithiol, 6-didecylamino-1,3,5-triazine-2,4-dithiol, 6-divinylamino-1,3,5-triazine-2,4-dithiol, 6-diallylamino-1,3,5-triazine-2,4-dithiol and 6-diisopropenylamino-1,3,5-triazine-2,4-dithiol, and their sodium, potassium, lithium, calcium or magnesium salt.

The more preferable specific examples are the 6-dioctylamino-1,3,5-triazine-2,4-dithiol and 6-diallylamino-1,3,5-triazine-2,4-dithiol and their sodium or lithium salt.

The amount of addition varies with the compounds of the formula (I) but these compounds are added generally in an amount of 1~100 mM.

BEST MODE FOR CARRYING OUT THE INVENTION

Figure 1:
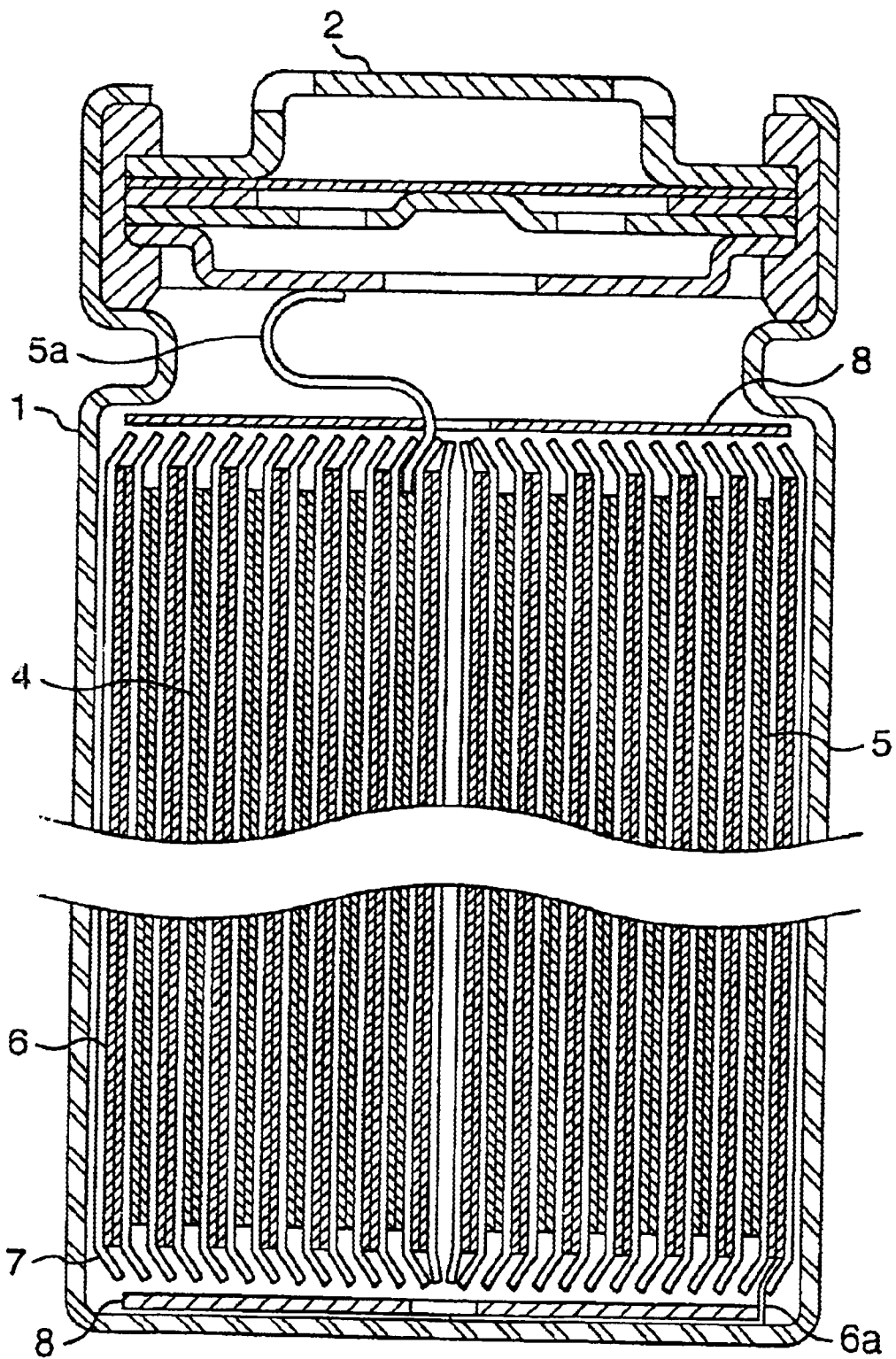
FIG. 1 is a longitudinal, sectional view of a cylindrical type battery according to one example of the present invention.

The electrolytes used in the present invention comprise at least one of 6-substituted-1,3,5-triazine-2,4-dithiol and its derivatives as described above, a non-aqueous solvent and a lithium salt which is dissolved in said solvent as the supporting electrolyte.

Furthermore, NaCl, $NaH_2PO_2$, $Na_2SO_4$, $Na_2SO_3$, $Na_2S_2O_3$, $NaNO_3$, $(NaPO_3)_6$, $Na_2CO_3$, $Na_2SiO_3$, $NaNO_2$, LiCl, $LiH_2PO_2$, $Li_2SO_3$, $LiNa_2S_2O_3$, $LiNO_3$, $(LiPO_3)_6$, $Li_2CO_3$, $Li_2SiO_3$, $LiNO_2$, KCl, $KH_2PO_2$, $K_2SO_4$, $K_2SO_3$, $K_2S_2O_3$, $KNO_3$, $(KPO_3)_6$, $K_2CO_3$, $K_2SiO_3$, $KNO_2$ are added into said electrolytes, to exert the preferable effect that the film-forming voltage and rate of the organic films can be controlled.

The non-aqueous solvents are, for example, acyclic esters including acyclic carbonates such as dimethyl carbonate (DMC), diethyl carbonate (DEC), ethylmethyl carbonate (EMC), dipropyl carbonate and the like; and aliphatic carboxylates such as methyl formate, methyl acetate, methyl propionate, ethyl propionate and like. Besides, the non-aqueous solvents also include cyclic carbonates such as ethylene carbonate (EC), propylene carbonate (PC), butylene carbonate (BC), vinylene carbonate (VC) and the like; γ-lactones such as γ-buryrolactone and the like; acyclic ethers such as 1,2-dimethoxyethane (DME), 1,2-diethoxyethane (DEE), ethoxymethoxyethane (EME) and the like; cyclic ethers such as tetrahydrofuran, 2-methyltetrahydrofuran and the like; and aproic organic solvents such as dimethyl sulfoxide, 1,3-dioxolane, formamide, acetamide, dimethylformamide, dioxolane, acetonitrile, propylnitrile, nitromethane, ethylmonoglyme, phosphoric triester, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, dimethylsulfoxide, N-methylpyrrolidone and the like, and these solvents are used singly or in combination of two or more.

The lithium salts are, for example, $LiClO_4$, $LiBF_4$, $LiPF_6$, $LiAlCl_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, lower aliphatic lithium carboxylate, LiCl, LiBr, LiI; borates such as chloroborane lithium, bis(1,2-benzenedioleate(2-)-O,O')lithium borate, bis(2,3-naphthalenedioleate(2-)-O,O')lithium borate, bis(2,2'-biphenyldioleate(2-)-O,O')lithium borate, bis(5-fluoro-2-oleate-1-benzene sulfonate-O,O')lithium borate and the like; and imido salts such as bistrifluoromethanesulfonyl imide lithium (($CF_3SO_2)_2NLi$), trifluoromethanesulfonyl nonafluorobutanesulfonyl imide lithium ($LiN(CF_3SO_2)$ $(C_4F_9SO_2)$) bispentafluoroethanesulfonyl imide lithium (($C_2F_5SO_2)_2NLi$) and the like. These lithium salts are used singly or in combination of two or more. Of them, the organic acid anion based lithium salts are preferably used, because they are excellent in heat stability as compared with the inorganic acid anion based lithium salts represented by lithium phosphofluoride, inhibiting the supporting electrolytes from pyrolysis and battery characteristics from deterioration at the time of use or storage at high temperatures.

Of lithium salts above, the bistrifluoromethanesulfonyl imide lithium (($CF_3SO_2)_2NLi$) has a reductive decomposition withstand voltage of 0V and an oxidative decomposition withstand voltage of 4.7V on the lithium base pole on a platinum electrode; the bispentafluoroethanesulfonyl imide lithium (($C_2F_5SO_2)_2NLi$) has a reductive decomposition withstand voltage of 0V and an oxidative decomposition withstand voltage of 4.7V on a platinum electrode; the bis(5-fluoro-2-oleate-1-benzene sulfonate-O,O')lithium borate has a reductive decomposition withstand voltage of 0V and an oxidative decomposition withstand voltage of 4.5V on a platinum electrode; and the bis(2,2'-biphenyldioleate(2-)-O,O')lithium borate has a reductive decomposition withstand voltage of 0V and an oxidative decomposition withstand voltage of 4.1V or more on a platinum electrode. Therefore, it is preferable to apply these organic acid anion lithium salts to an active material such as the lithium cobaltate, lithium nickelate or lithium manganate capable of emitting a high voltage of 4 V or more to the lithium base pole to provide the lithium secondary batteries with a high energy density.

On the other hand, the bis(1,2-benzenedioleate(2-)-O,O') lithium borate has a reductive decomposition withstand voltage of 0V and an oxidative decomposition withstand voltage of 3.6V on the lithium base pole on a platinum electrode and the bis(2,3-naphthalenedioleate(2-)-O,O') lithium borate has a reductive decomposition withstand voltage of 0V and an oxidative decomposition withstand voltage of 3.8V on the lithium base pole on a platinum electrode. If the electrolytes dissolving these supporting electrolytes are applied to the active materials such as the lithium cobaltate, lithium nickelate or lithium manganate capable of emitting a high voltage of 4 V or more to the lithium base pole, the supporting electrolytes would be decomposed. However, the transition metal sulfides such as lithium titanium disulfide ($LiTiS_2$) and lithium molybdenum disulfide ($LiMoS_2$) having an electromotive force emitting approximately 3V to the lithium base pole can be used in this range of voltages.

It is not particularly limited how much non-aqueous electrolytes should be added to the batteries and the non-aqueous electrolytes are used as much as they are needed depending upon the amount of the positive and negative materials and the size of batteries. It also is not particularly limited how much supporting electrolytes should be dissolved in the non-aqueous solvents but the supporting electrolytes are dissolved therein preferably in an amount of 0.2~2 mol/l. Particularly, they are dissolved therein more preferably in an amount of 0.5~1.5 mol/l.

The other compounds can effectively be added to the electrolytes for the purpose of improving discharge or charge-discharge characteristics. Those which can be added herein are, for example, a triethyl phosphite, triethanolamine, cyclic ethers, ethylenediamine, n-glyme, pyridine, triamide hexaphosphate, nitrobenzene derivatives, crown ethers, quaternary ammonium salts, ethyleneglycoldialkylethers and the like.

The negative materials are prepared by the use of materials capable of doping and dedoping the metal lithium or lithium. The materials capable of doping and dedoping the lithium are pyrolysis carbons; cokes (pitch coke, needle coke, petroleum coke); graphites; glassy carbons; organic polymer compound-calcined materials (the materials obtained by calcining and carbonizing phenol resin, furan resin or the like at an appropriate temperatures), carbon materials such as carbon fiber, active carbon and the like; polymers such as polyacetylene, polypyrrole, polyacene and the like; lithium-containing transition metal oxides or transition metal sulfides such as $Li_{4/3}Ti_{5/3}O_4$, $TiS_2$ and the like; metals capable of alloying with the alkaline metals such as aluminum (Al), lead (Pb), bismuth (Bi), silicon (Si) and the like; interstitial alkaline metal inserted type crystal system based intermetallic compounds (AlSb, $Mg_2Si$ $NISi_2$); and lithium-nitrogen compounds ($Li_{(3-x)}M_xN$ (M: transition metal)) and the like. Of them, the carbon materials are suitable and, for example, if a carbon material having 0.340 nm or less distant (002) faces, i.e. graphite, is used, the energy density of the batteries is preferably improved. These negative materials can be mixed and used.

The conductive materials for negative electrode are any of the electronic conductive materials. For example, the graphites such as natural graphite (scaly graphite and the like), artificial graphite and the like; carbon blacks such as acetylene black, ketjen black, channel black, furnace black, lamp black, thermal black and the like; conductive fibers such as carbon fiber, metallic fiber and the like; powder of such metals as carbon fluoride, copper, nickel and the like; organic conductive materials such as polyphenylene derivatives and the like can be incorporated singly or in the form of their mixtures. Of these conductive materials, the artificial graphite, acetylene black and carbon fibers are particularly preferable. The amount of addition is not particularly limited but the conductive materials are added in an amount preferably of 1~50% by weight, more preferably of 1~30% by weight. Meanwhile, the negative materials of the present invention are electronically conductive by themselves, enabling the batteries to work without adding the conductive materials.

The binders for negative electrode are either thermoplastic resin or thermosetting resin. Preferable resin for the present invention is, for example, polyethylene, polypropylene, polytetrafluoroethylene (PTFE), polyvinylidene fluoride (PVDF), styrene-butadine rubber, tetrafluoroethylene-hexafluoro propylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene terpolymer, vinylidene fluoride-perfluoromethyl-vinylether-tetrafluoroethylene terpolymer, ethylene-acrylate copolymer or ($Na^+$) ion crosslinked material thereof, ethylene-methacrylate copolymer or ($Na^+$) ion crosslinked material thereof, ethylene-methyl acrylate copolymer or ($Na^+$) ion crosslinked material thereof, and ethylene-methyl methacrylate copolymer or ($Na^+$) ion crosslinked material thereof. These materials can be used singly or in the form of a mixture. Of them, more preferable materials are styrene-butadiene rubber, vinylidene polyfluoride, ethylene-acrylate copolymer or ($Na^+$) ion crosslinked material thereof, ethylene-metacrylate copolymer or ($Na^+$) ion crosslinked material thereof, ethylene-methyl acrylate copolymer or ($Na^+$) ion crosslinked material thereof, and ethylene-methyl metacrylate copolymer or ($Na^+$) ion crosslinked material thereof.

The electronic collectors for negative electrode are any of the electronic conductive materials free from the chemical reactions in the finished batteries. The materials which can be used herein are, for example, stainless steel, nickel, copper, titanium, carbon, conductive resin and, in addition to them, copper or stainless steel having the surfaces treated with carbon, nickel or titanium. Particularly, copper and the copper alloy are preferable. These materials can be suitably oxidized on their surface and then be put to use. The surfaces of electronic collector are desirably made uneven with the surface treatment. The electronic collectors are used in the shape of a film, sheet, net, punched material, lath material, porous material, expanded material and molded material from a group of fibers, in addition to a foil. The thickness is not particularly limited but the collectors having a thickness of 1~500 $\mu$m are used.

The positive materials, which can be used herein, are either lithium containing or lithium-free compounds. The positive materials are, for example, $Li_xCoO_2$, $Li_xNiO_2$, $Li_xMnO_2$, $Li_xCo_yNi_{1-y}O_2$, $Li_xCo_yM_{1-y}O_z$, $LixNi_{1-y}M_yO_2$, $Li_xMn_2O_4$, $Li_xMn_{2-y}M_yO_4$ (M is at least one kind from among Na, Mg, Sc, Y, Mn, Fe, Co, Ni, Cu, Zn, Al, Cr, Pb, Sb and B, wherein x=0~1.2, y=0~0.9, z=2.0~2.3). The x value hereof is a pre-charge and discharge value and varies with the charge-discharge operations. The other positive active materials may as well be used, including transition metal chalcogen compounds, vanadium oxides and lithium compounds thereof, niobium oxides and lithium compounds thereof, conjugative polymers using the organic conductive materials; Chevrel's phase compounds and the like. Furthermore, a plurality of different positive active materials can be mixed and then be used. The average particle diameter of the positive active materials is not particularly limited but is preferably in a range of 1~30 $\mu$m.

The conductive materials for positive electrode are any of electronic conductive materials incapable of causing any chemical reactions at the charge-discharge voltages of the positive materials intended for use herein. For example, the graphites such as natural graphite (scaly graphite and the like), artificial graphite and the like; carbon blacks such as acetylene black, ketjen black, channel black, furnace black, lamp black, thermal black and the like; conductive fibers such as carbon fiber, metallic fiber and the like; powder of such metals as carbon fluoride, copper, nickel, aluminum, silver and the like; conductive whiskers such as lead oxide, potassium titanate and the like; conductive metal oxides such as titanium oxide and the like; organic conductive materials such as polyphenylene derivatives and the like, and these conductive materials can be incorporated into the positive electrodes singly or in the form of their mixture. Of these conductive materials, the artificial graphite, acetylene black and nickel powder are particularly preferable. The amount of conductive materials to be added is not particularly limited but the conductive materials are added preferably in an amount of 1~50% by weight, more preferably 1~30% by weight. The carbon and graphite are added particularly preferably in an amount of 1~30% by weight.

The binders for positive electrode are either thermoplastic resin or thermosetting resin. Preferable resin for the present invention is, for example, polyethylene, polypropylene, polytetrafluoroethylen (PTFE), vinylidene polyfluoride (PVDE), tetrafluoroethylene-hexafluoroethylene copolymer, tetrafluoroethylene-hexafluoropropylene copolymer (FEP), tetrafluoroethylene-perfluoroalkylvinylether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene terpolymer, vinylidene fluoride-perfluoromethylvinylether-tetrafluoroethylene terpolymer, ethylene-acrylate copolymer or ($Na^+$) ion crosslinked material thereof, ethylene-methacrylate copolymer or ($Na^+$) ion crosslinked material thereof, ethylene-methyl acrylate copolymer or ($Na^+$) ion crosslinked material thereof, and ethylene-methyl methacrylate copolymer or ($Na^+$) ion crosslinked material thereof. Of them, more preferable binders are the polyvinylidene fluoride (PVDF) and polytetrafluoro-ethylene (PTFE).

The electronic collectors for positive electrode are any of the electronic conductive materials incapable of causing any chemical reactions at the charge-discharged voltages of the positive materials intended for use. The materials, which can be used herein are, for example, aluminum or stainless steel treated on the surface with carbon or titanium, in addition to stainless steel, aluminum, titanium, carbon, conductive resin. Particularly, aluminum and the aluminum alloy are preferable. These materials may as well be oxidized on their surface and then be put to use. The surface of electronic collectors is desirably made uneven with the surface treatment. The electronic collectors are used in the shape of a film, sheet, net, punched material, lath material, porous material, expanded material, group of fibers and molded material of unwoven fabrics, in addition to a foil. The thickness is not particularly limited but the electronic collectors having a thickness of 1~500 μm are ordinarily used.

The mixtures for electrode may comprise the fillers, dispersants, ion carrier, pressure boosters and various other additives, in addition to the conductive materials and binders. The fillers, which can be used herein, are any of fibrous materials incapable of causing any chemical reactions in the finished batteries. Ordinarily, the fibers made of olefinic polymers such as polypropylene, polyethylene and the like or of glass, carbon and the like are used as the fillers. The amount of fillers to be added is not particularly limited, but the fillers are added preferably in an amount of 0~30% by weight The negative plate and the positive plate are arranged preferably in the way the surface of positive mixture and that of negative mixture sit at least opposite to each other.

The separators, which can be used herein, are an insulating microporous thin film having a high ion transmittance and a predetermined mechanical strength. Preferably, the separators can work to close the pores and increase resistance at a predetermined temperature or higher. The separators comprise a sheet or a woven or unwoven fabric made from the olefinic polymer using polypropylene, polyethylene and the like singly or in combination or made from glass fibers and the like to impart resistance against the organic solvents and impart hydophobicity. The pore size of the separators is desirably in a range of, for example, 0.01~1 μm wherein the positive and negative materials, binders and conductive materials are not permitted to transmit after they are desorbed from the battery sheets. Ordinarily the separators have a thickness of 10~300 μm. The voids are determined on the basis of permeability of electrons or ions as well as the materials and film pressure, and ordinarily the separators have desirably a voids of 30~80%

A polymer material that absorbs and holds an organic electrolyte comprising a solvent and a lithium salt dissolved in said solvent is incorporated respectively into a positive electrode mixture and a negative electrode mixture, and thereafter a porous separator comprising the polymer material absorbing and holding the organic electrolyte, the positive electrode and the negative electrode are integrated into one piece and in this way a battery can be finished. The polymer materials, which can be used herein, are any of those capable of absorbing and holding the organic electrolytes, and particularly the vinylidene fluoride-hexafluoropropylene copolymers are preferable.

The batteries are in the shape of any of coin type, button type, sheet type, laminated type, cylindrical type, flat type, angular type, oversized type that is intended for use in electric cars, and the like.

The non-aqueous electrolyte secondary batteries of the present invention can find their application in portable information terminals, portable electronic appliances, household small size power storage equipment, motorbicycles, electric cars, hybrid electric cars and the like but the non-aqueous electrolyte secondary batteries of the present invention are not particularly limited to those cited above.

EXAMPLE

The present invention will be explained in greater detail below with reference to examples, but it should be noted that the present invention is not limited to these examples.

Example 1

FIG. 1 is a longitudinal, sectional view of a cylindrical type battery of the present invention. A positive plate 5, a negative plate 6 and a separator 7 arranged between them are wound around plural times to take the shape of a spiral and are arranged into a battery case 1. A positive lead 5a is pulled out of said positive plate 5 and connected with a sealing plate 2, and a negative lead 6a is pulled out of the negative plate 6 and connected with the bottom of the battery case 1. The battery case and leading plates can be prepared from the electronically conductive metals or alloys resistant to the organic electrolytes. For example, the metals such as iron, nickel, titanium, chromium, molybdenum, copper, aluminum and the like or their alloys may be used herein. Particularly, it is most preferable that processing a stainless steel or Al—Mn alloy plate makes the battery case and that the positive leads are made of aluminum and the negative leads are made of nickel. Furthermore, the battery case may as well be made by the use of various engineering plastics or their combination with the metals for the purpose of lightening. The numeral 8 is designated to insulating insulting rings that are set respectively on the top and bottom of an element 4. Thereafter, an electrolyte is injected and a sealing plate is fitted thereinto to form a battery can. At this point, a safety valve can be used as the sealing plate. Besides the safety valve, various known safety components may as well be arranged. For example, a fuse, bimetal, PTC component and the like are suitably used as the overcurrent protective device. Furthermore, in addition to the safety valve, a method of notching the battery case, a method of cracking the gasket or sealing plate or a method of breaking off from the lead plates can be used to prevent the increase of internal pressure within the battery. A battery charger may as well contain or be independently connected with a protective circuit incorporating a countermeasure against overcharge or overdischarge. Furthermore, the overcharge can be countered by a system for cutting off the current with the rise of internal pressure of the battery. For this, the compounds capable of increasing the internal pressure can be incorporated into the mixtures or electrolytes. The compounds capable of increasing the internal pressure are carbonates such as $Li_2CO_3$, $LiHCO_3$, $Na_2CO_3$, $NaHCO_3$, $CaCO_3$, $MgCO_3$ and the like. The cap, battery case, sheets and lead plates are welded by the use of the known methods (for example, electric welding with the direct or alternating current, laser welding and ultrasonic welding). The sealers, which can be used for the sealing plates, are conventionally known compounds such as asphalt and the like or their mixtures.

The negative plate 6 was prepared by mixing 20% by weight of a carbon powder as the conductive material and 5% by weight of a polyvinylidene fluoride resin as the binder with 75% by weight of an artificial graphite powder, dispersing them in a dehydrated N-methylpyrrolidinone to make a slurry, applying the slurry on a negative electronic collector comprising a copper foil and drying and then rolling.

On the other hand, the positive plate 5 was prepared by mixing 10% by weight of a carbon powder as the conductive material and 5% by weight of a polyvinylidene fluoride resin as the binder with 85% by weight of a lithium cobaltate powder, dispersing them in a dehydrated N-methylpyrrolidinone to make a slurry, applying the slurry on a positive electronic collector comprising an aluminum foil and drying and then rolling.

The element prepared in this way was packed into a battery case and a non-aqueous electrolyte listed in Table 1 was injected thereinto to make a battery. The so prepared cylindrical type battery was found to have a diameter of 18 mm and a height of 65 mm.

These batteries were operated by repeating the charge-discharge cycles charging the batteries up to 4.2 V with a constant current of 1120 mA at first and thereafter discharging them down to 2.0 V with the same constant current of 1120 mA. The charge-discharge was repeated to the extent of 200 cycles, and the initial discharge capacity and the discharge capacity at the 200th cycle are shown in Table 2. Furthermore, the identically prepared batteries were charged up to 4.2 V and discharged down to 2.0 V with a constant current of 1120 mA, and after the initial battery capacity was measured, the batteries were charged up to 4.2 V again on the same conditions and stored at 60° C. for 20 days, and Table 2 shows the discharge capacity after storage and the amount of gas collected in liquid paraffin by making a hole on the post-storage batteries.

TABLE 1

| | Composition of Electrolyte (Ratio by Volume) | Kind & Added Amount of 6-Substituted-1,3,5-Triazine-2,4-Dithiol |
|---|---|---|
| Battery 1 | Ethylene Carbonate/Ethyl-methyl Carbonate = 1/1 + 1.0M LiPF$_6$ | 6-Dioctylamino-1,3,5-Triazine-2,4-Dithiol 5 mM |
| Battery 2 | Ethylene Carbonate/Ethyl-methyl Carbonate = 1/1 + 1.0M LiPF$_6$ | 6-Dioctylamino-1,3,5-Triazine-2,4-Dithiol Lithium 5 mM |
| Battery 3 | Ethylene Carbonate/Ethyl-methyl Carbonate = 1/1 + 1.0M LiPF$_6$ | 6-Diallylamino-1,3,5-Triazine-2,4-Dithiol 5 mM |
| Battery 4 | Ethylene Carbonate/Ethyl-methyl Carbonate = 1/1 + 1.0M LiPF$_6$ | 6-Diallylamino-1,3,5-Triazine-2,4-Dithiol Lithium 5 mM |
| Battery 5 | Ethylene Carbonate/Diethyl Carbonate = 1/1 + 1.0M LiPF$_6$ | 6-Diallylamino-1,3,5-Triazine-2,4-Dithiol Lithium 5 mM |
| Battery 6 | Ethylene Carbonate/Dimethyl Carbonate = 1/1 + 1.0M LiPF$_6$ | 6-Diallylamino-1,3,5-Triazine-2,4-Dithiol Lithium 5 mM |
| Battery 7 | Ethylene Carbonate/γ-Butyrolactone = 1/1 + 1.0M LiPF$_6$ | 6-Diallylamino-1,3,5-Triazine-2,4-Dithiol Lithium 5 mM |
| Battery 8 | γ-Butyrolactone + 1.0M LiPF$_6$ | 6-Diallylamino-1,3,5-Triazine-2,4-Dithiol Lithium 5 mM |
| Battery 9 | Ethylene Carbonate/Ethyl-methyl Carbonate = 1/1 + 1.0M LiPF$_6$ | 6-Diallylamino-1,3,5-Triazine-2,4-Dithiol Lithium 1 mM |
| Battery 10 | Ethylene Carbonate/Ethyl-methyl Carbonate = 1/1 + 1.0M LiPF$_6$ | 6-Diallylamino-1,3,5-Triazine-2,4-Dithiol Lithium 10 mM |

TABLE 1-continued

| | Composition of Electrolyte (Ratio by Volume) | Kind & Added Amount of 6-Substituted-1,3,5-Triazine-2,4-Dithiol |
|---|---|---|
| Battery 11 | Ethylene Carbonate/Ethyl-methyl Carbonate = 1/1 + 1.0M LiPF$_6$ | 6-Diallylamino-1,3,5-Triazine-2,4-Dithiol Lithium 100 mM |
| Battery 12 | Ethylene Carbonate/Ethyl-methyl Carbonate = 1/1 + 1.0M LiPF$_6$ | 6-Diallylamino-1,3,5-Triazine-2,4-Dithiol 1 mM |
| Battery 13 | Ethylene Carbonate/Ethyl-methyl Carbonate = 1/1 + 1.0M LiPF$_6$ | 6-Diallylamino-1,3,5-Triazine-2,4-Dithiol 10 mM |
| Battery 14 | Ethylene Carbonate/Ethyl-methyl Carbonate = 1/1 + 1.0M LiPF$_6$ | 6-Diallylamino-1,3,5-Triazine-2,4-Dithiol 100 mM |
| Battery 15 | Ethylene Carbonate/Ethyl-methyl Carbonate = 1/1 + 1.0M LiPF$_6$ | Not Added |

TABLE 2

| | Initial Capacity/mAh | 200th Cycle Capacity/mAh | Capacity After Storage/mAh | Gas Amount After storage/ml |
|---|---|---|---|---|
| Battery 1 | 1550 | 1498 | 1523 | 1.1 |
| Battery 2 | 1548 | 1488 | 1538 | 0.9 |
| Battery 3 | 1562 | 1503 | 1523 | 1.0 |
| Battery 4 | 1558 | 1508 | 1536 | 0.8 |
| Battery 5 | 1573 | 1533 | 1549 | 0.9 |
| Battery 6 | 1563 | 1510 | 1532 | 1.0 |
| Battery 7 | 1578 | 1531 | 1555 | 1.1 |
| Battery 8 | 1577 | 1546 | 1562 | 1.3 |
| Battery 9 | 1593 | 1495 | 1578 | 1.4 |
| Battery 10 | 1569 | 1523 | 1482 | 0.6 |
| Battery 11 | 1573 | 1542 | 1448 | 0.3 |
| Battery 12 | 1588 | 1478 | 1576 | 1.4 |
| Battery 13 | 1577 | 1508 | 1475 | 0.5 |
| Battery 14 | 1564 | 1523 | 1450 | 0.3 |
| Battery 15 | 1584 | 1350 | 1305 | 4.7 |

As evident from Table 2, the present invention provides the lithium secondary batteries very low in the gas evolution, excellent in cycle life and high-temperature storage characteristics and high in reliability.

Although the positive material used in the present example was the lithium cobaltate, it is clear that the use of the other transition metal oxides such as lithium nickelate and lithium manganate and the transition metal sulfides such as titanium disulfide and molybdenum disulfide can produce as good an effect, and the present invention is not limited to the present examples. Furthermore, although the negative material used in the present examples were artificial graphite, the use of the metal lithium, lithium alloy and compound negative electrodes as well as the carbon materials other than artificial graphite that are capable of storing and/or releasing the lithium can produce as good an effect without modifying the nature of the present invention, and the present invention is not limited to the present examples.

The methods for preparing the electrodes do not modify the nature of the present invention, and the present invention is not limited to the present examples.

Furthermore, the kind, combination and mixing ratio of electrolytes as well as the amount of supporting electrolyte to be added as illustrated in the present invention are not determined tightly, and the persons skilled in the art can optionally decide what combination, mixing ratio and amount they like on the basis of their technical common sense. Therefore, the electrolytes are not limited to their kinds, combinations and mixing ratios described in the present examples. With respect to the supporting electrolytes, however, their description need to be selected depending upon the positive materials intended for use and in consideration of the oxidation withstand voltages, and therefore the selection can also be made by the persons skilled in arts on the basis of their technical common sense.

INDUSTRIAL APPLICABILITY

As described above, by improving the chemical stability of the non-aqueous electrolyte in non-aqueous electrochemical devices, the present invention has been able to provide novel non-aqueous electrochemical devices capable of inhibiting the deterioration of characteristics caused by gas generated at the time of charging or high temperature storage and by the elution of active materials, particularly by the elution of metals from the positive materials, workable in a wide range of temperatures, having a high energy density, insignificant in the fall of discharge capacity even after the repeated use and excellent in high rate charge-discharge characteristics.

We claim:

1. An electrolyte for non-aqueous electrochemical device containing at least one of 6-substituted-1,2,3-triazine-2,4-dithiol and derivatives thereof represented by the following formula (1):

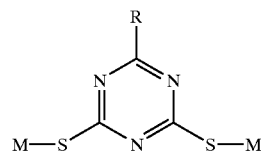

(I)

wherein R is represented by the formula —NR$_1$R$_2$ in which R$_1$ and R$_2$ are each independently alkyl; M is an element selected from the group consisting of a hydrogen, an alkali, calcium and magnesium.

2. The electrolyte for non-aqueous electrochemical device according to claim 1 wherein the 6-substituted-1,2,3-triazine-2,4-dithiol and derivatives thereof are a 6-dioctylamino-1,3,5-triazine-2,4-dithiol, 6-dioctylamino-1,3,5-triazine-2,4-dithiol sodium, 6-dioctylamino-1,3,5-triazine-2,4-dithiol lithium, 6-diallylamino-1,3,5-triazine-2,4-dithiol, 6-diallylamino-1,3,5-triazine-2,4-dithiol sodium or 6-diallylamino-1,3,5-triazine-2,4-dithiol lithium.

3. A non-aqueous electrochemical device comprising at least two electrodes, a non-aqueous electrolyte dissolving a solute in a non-aqueous-solvent and a separator arranged between the two electrodes, wherein the non-aqueous electrolyte comprises at least one of 6-substituted-1,3,5-triazine-2,4-dithiol and derivatives thereof represented by the following formula (1):

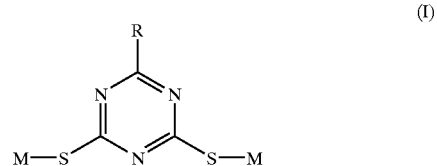

(I)

wherein R is a nitrogen-containing functional group; and M is an element selected from the group consisting of a hydrogen, an alkali metal, calcium and magnesium.

4. The non-aqueous electrochemical device according to claim 3 wherein the 6-substituted-1,2,3-triazine-2,4-dithiol and derivatives thereof are a 6-dioctylamino-1,3,5-triazine-2,14-dithiol, 6-dioctylamino-1,3,5-triazine-2,4-dithiol sodium, 6-dioctylamino-1,3,5-triazine-2,4-dithiol lithium, 6-diallylamino-1,3,5-triazine-2,4-dithiol, 6-diallylamino-1,3,5-triazine-2,4-dithiol sodium or 6-diallylamino-1,3,5-triazine-2,4-dithiol lithium.

5. A lithium secondary battery comprising a positive electrode, a negative electrode comprising a lithium as an active material, a non-aqueous electrolyte dissolving a solute containing a lithium as a cation in a non-aqueous solvent and a separator arranged between the two electrodes, wherein the non-aqueous electrolyte comprises at least one of 6-substituted-1,3,5-triazine-2,4-dithiol and derivatives thereof represented by the following formula (1):

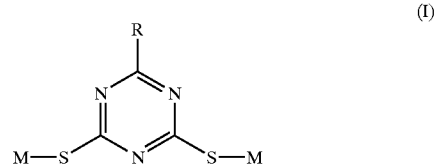

(I)

wherein R is a nitrogen-containing functional group; and is an element selected from the group consisting of a hydrogen, an alkali metal, calcium and magnesium.

6. The lithium secondary battery according to claim 5 wherein the 6-substituted-1,2,3-triazine-2,4-dithiol and derivatives thereof are a 6-dioctylamino-1,3,5-triazine-2,4-dithiol, 6-dioctylamino-1,3,5-triazine-2,4-dithiol sodium, 6-dioctylamino-1,3,5-triazine-2,4-dithiol lithium, 6-diallylamino-1,3,5-triazine-2,4-dithiol, 6-diallylamino-1,3,5-triazine-2,4-dithiol sodium or 6-diallylamino-1,3,5-triazine-2,4-dithiol lithium.

* * * * *